United States Patent
Dubach

(10) Patent No.: US 8,372,328 B2
(45) Date of Patent: Feb. 12, 2013

(54) SEMI-FINISHED PRODUCT FOR PRODUCING AN OPENING APPARATUS

(75) Inventor: Werner Fritz Dubach, Maur (CH)

(73) Assignee: Deltona Innovations AG, Maur (CH)

( * ) Notice: Subject to any disclaimer, the term of this patent is extended or adjusted under 35 U.S.C. 154(b) by 901 days.

(21) Appl. No.: 12/312,059

(22) PCT Filed: Oct. 15, 2007

(86) PCT No.: PCT/CH2007/000507
§ 371 (c)(1),
(2), (4) Date: Apr. 23, 2009

(87) PCT Pub. No.: WO2008/049249
PCT Pub. Date: May 2, 2008

(65) Prior Publication Data
US 2009/0277860 A1   Nov. 12, 2009

(30) Foreign Application Priority Data
Oct. 23, 2006   (CH) ...................................... 1678/06

(51) Int. Cl.
*B67D 1/00*   (2006.01)

(52) U.S. Cl. ............ 264/268; 222/83; 222/88; 215/225; 215/249; 220/212; 220/264

(58) Field of Classification Search .................. 215/295, 215/227, 43, 44, 214, 217, 218, 243, 329, 215/228, 253; 220/212, 265, 257.1, 256.1, 220/254.8, 254.1; 206/219; 222/80, 81, 222/83, 88; 264/268
See application file for complete search history.

(56) References Cited

U.S. PATENT DOCUMENTS

| | | | | |
|---|---|---|---|---|
| 5,141,133 A * | 8/1992 | Ninomiya et al. | | 222/83 |
| 6,851,576 B2 * | 2/2005 | Dubach | | 222/83 |
| 6,921,087 B2 * | 7/2005 | Takahashi et al. | | 277/628 |
| 7,036,683 B2 * | 5/2006 | Dubach | | 222/83 |
| 7,891,509 B2 * | 2/2011 | Konefal | | 215/216 |
| 7,980,424 B2 * | 7/2011 | Johnson | | 222/83 |
| 8,020,729 B2 * | 9/2011 | Dubach | | 222/83 |
| 8,152,015 B2 * | 4/2012 | Dubach | | 220/212 |
| 2002/0179605 A1* | 12/2002 | Miani et al. | | 220/277 |
| 2004/0055990 A1* | 3/2004 | Dubach | | 215/252 |

(Continued)

FOREIGN PATENT DOCUMENTS

DE   197 12 334 A1   10/1998
EP   0 318 603   6/1989

(Continued)

*Primary Examiner* — Mickey Yu
*Assistant Examiner* — Kareen Rush
(74) *Attorney, Agent, or Firm* — Pauley Petersen & Erickson

(57) ABSTRACT

An apparatus for opening sealed packaging, including three parts, a pouring nozzle having a flange, a cylindrical cutting element and a screwcap. According to this invention, all three parts of the apparatus are produced in one piece as a semi-finished product. The teeth of the cutting element protrude into the pouring nozzle, while the screwcap is held on the flat edge of the cutting element. The three parts are connected to one another via predetermined breaking point bridges. This invention reduces the production costs and simplifies the assembly and the systems which are required for this purpose.

15 Claims, 5 Drawing Sheets

U.S. PATENT DOCUMENTS

| | | | |
|---|---|---|---|
| 2004/0104245 A1* | 6/2004 | Dubach | 222/83 |
| 2006/0081646 A1* | 4/2006 | Rho | 222/80 |
| 2006/0144852 A1* | 7/2006 | Dubach | 222/83 |
| 2006/0261028 A1* | 11/2006 | Dubach | 215/257 |
| 2009/0250488 A1* | 10/2009 | Dubach | 222/83 |
| 2010/0264146 A1* | 10/2010 | Casale et al. | 220/278 |

FOREIGN PATENT DOCUMENTS

| | | |
|---|---|---|
| EP | 1 088 764 A1 | 4/2001 |
| EP | 1 415 926 A1 | 5/2004 |
| WO | WO 99/62776 | 12/1999 |
| WO | WO 2004/041669 A1 | 5/2004 |

\* cited by examiner

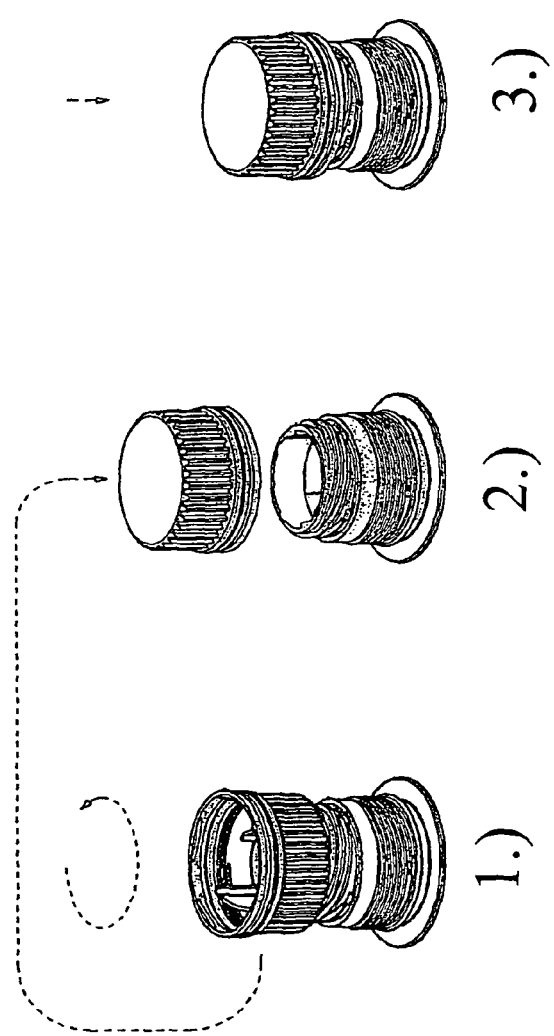

SEMI-FINISHED PRODUCT FOR PRODUCING AN OPENING APPARATUS

BACKGROUND OF THE INVENTION

1. Field of the Invention

This invention relates to a semi-finished product for the manufacture of a closable opening device for a sealed packaging, which contains a pourable medium, wherein the device includes a pour-out spout with a flange, a cylindrical cutting element with an upper edge defining a plane surface, the lower edge having one or more teeth, and an inner skirt surface with catches which act in the radial direction and which cooperate with catches on the inner side of the cover surface in a screw cap.

2. Discussion of Related Art

A closable opening device of the initially mentioned type is known from European Patent Reference EP-A-1088764, which applies a principle generally common with closure technology, that multipart closures are manufactured so that two parts are arranged above one another and are injected as one piece, connected to one another via breakage locations. An effort with regard to tooling is reduced and the assembly is simplified, because the parts which are connected to one another via breakage locations are arranged to one another already in their exactly aligned relative position and thus only need to be pushed together. With the solution known from the prior art, the semi-finished product is only of a connection of a pour-out spout to a flange together with a cylindrical cutting element. The combination of a semi-finished product for the manufacture of a closable opening device as described further above, with which not only the pour-out spout is manufactured as one piece not only connected to the cutting element, but also to a screw cap, has not been considered as possible by the people skilled in the art. The reason for this consideration is that one has always assumed that all parts connected to one another should be connected to one another in the correct position for the final assembly, in order to have the required usefulness.

Under these preconditions however, all three parts may not be manufactured in a single-piece semi-finished product because the inner diameters of the three parts are different and the screw cap is closed on one side. In the position which is correct for assembly the cutting element with its smallest inner diameter would be at the very bottom and thus, above this, the pour-out spout with its flange, and in turn, above this, the screw cap whose inner diameter is the largest. With this arrangement however, the core of the tool may not be pulled out of such a semi-finished product. Were the screw cap only a cylindrical element open on both sides, then this would be possible, but this is not the case. For this reason, in the state of the art, only the manufacture of a semi-finished product is known, with which the cutting element is manufactured as one piece with the pour-out spout. Such a semi-finished product is known from European Patent References EP-A-1088764 and EP-A-1084060.

SUMMARY OF THE INVENTION

It is one object of this invention to provide a semi-finished product for manufacture of a closable opening device, with which all three parts of the closable opening device may be manufactured in one piece with regard to injection molding technology.

This invention further relates to a method for the manufacture of a closable opening device from the semi-finished product according to this invention. Also, the invention relates to a closable opening device of the initially mentioned type, which results from the use of the semi-finished product according to this invention.

Further advantageous designs of the semi-finished product as well as of the method of this invention are described in this specification and in the claims.

The formation of a semi-finished product, with which all three parts of the closable opening device may be manufactured as one piece, and not only has the advantage that tooling costs may be saved by using only one single injection mold, but also the assembly device as a whole is simplified, and significantly less expensive and significantly lower rejection rates are to be expected.

With regard to the solution known until now, although the cutting element and the pour-out spout push together into the definitive position in a single simple method step, the attachment of the screw cap is relatively complex. The two parts which are already assembled must be brought into a predefined position to a further assembly station. Here, the screw cap must be brought in the axially correctly aligned position above the pour-out spout, and then be brought into a defined radial alignment to the cutting element, so that the catches in the screw cap are in a correct relative position with respect to the catches in the cutting element. The parts may then be pushed together, and the opening device is in the position ready for use.

This assembly method part which is complex, because the radial alignment of the two parts must be very precise, while simultaneously, also a slight radial shifting is effected with the first assembly step with which the cutting element is pushed into the pour-out spout. With this movement, the outer thread of the cutting element is pushed into the inner thread of the pour-out spout and small radial displacements may be avoided. If such radial displacements are larger than a certain tolerance range, then often the complete closable opening device is destroyed in the subsequent assembly step.

BRIEF DESCRIPTION OF THE DRAWINGS

The semi-finished product according to this invention, and the method for manufacture of the closable opening device from the semi-finished product, is explained in view of the accompanying drawings, wherein:

FIG. 6 schematically shows an assembly method in three steps.

DETAILED DESCRIPTION OF THE INVENTION

Figure 1:
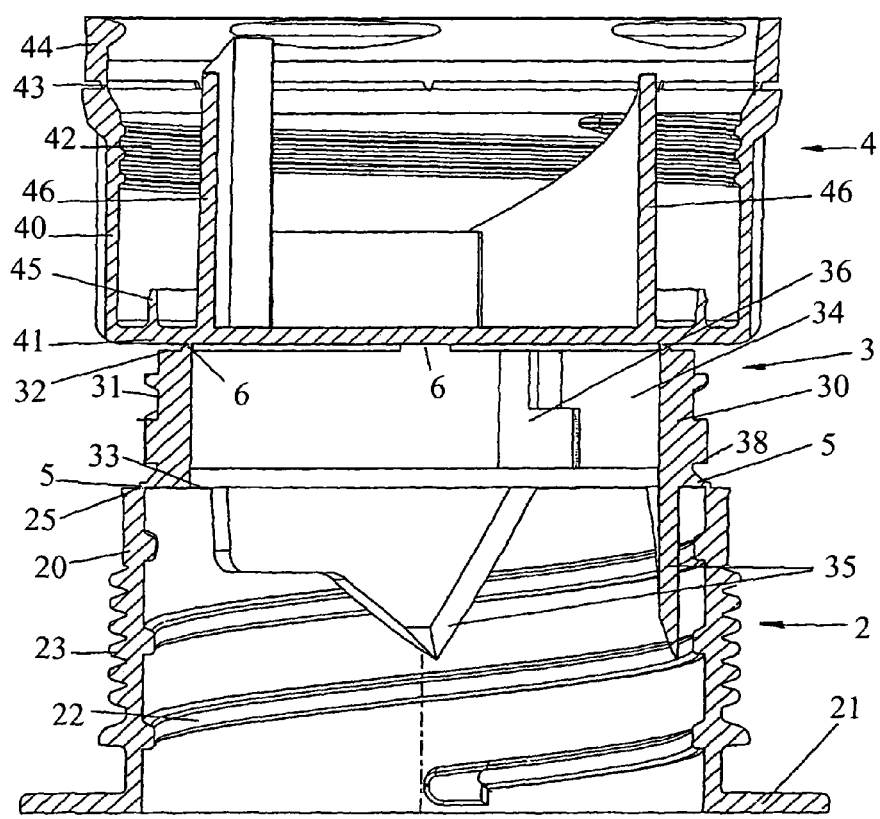
FIG. 1 is an axial vertical section taken through the semi-finished product, in the condition as it comes from a corresponding injection mold.

FIG. 1 shows an axial vertical section taken through a semi-finished product according to this invention, which is shown in its entirety as element reference numeral 1. The semi-fished product 1 is of one piece, wherein the closable opening device which is indicated at 100 in the assembled condition of FIG. 5, comprises three parts which are injected together. These three parts in FIG. 1, and from the bottom to the top, are a pour-out spout 2 above which a cutting element 3 is arranged, and above which in turn a screw cap 4 is located.

The pour-out spout 2 has a cylindrical skirt wall 20 which forms the actual pour-out and at the end comprises a flange 21 on its lower edge. The cylindrical skirt wall has an inner thread 22 with a greater thread pitch, and an outer thread 23 which is designed as a fine thread with a relatively small pitch. The cross section of the inner thread has a cross-sectional shape which is roughly trapezoidal. This cross sectional shape despite a relatively large thread height, permits the pushing together of an element with the second element with an equal and opposite outer thread.

The element with the equal and opposite outer thread which fits with the inner thread 22, is the cutting element 3. The cutting element 3 comprises a cylindrical skirt wall section 30 with an outer thread 31 which is designed to fit with the inner thread 22 of the pour-out spout 2. The cylindrical skirt wall section 30 at its upper end has an upper edge 32 which is essentially planar. In contrast, one or more teeth 35 are integrally formed on the lower edge 33. This special design of the teeth is not the subject-matter of this invention. One tooth 35 is shown in a plan view and a second tooth in section in the drawing.

The cylindrical skirt wall section 30 has an inner skirt wall surface 34 on which at least one, preferably two catches 36 are integrally formed. A catch 36 is shown in the drawing. The second catch which is present as the case may be, is usually arranged diametrically opposite the first catch. The catch 36 comprises a console-like projection, which is integrally formed on the inner skirt wall surface 34.

As mentioned, a screw cap 4 is over the cutting element 3. The pour-out spout 2 and the cutting element 3 are arranged relative to one another in the correct assembly position and are only located axially displaced over one another, and the screw cap is arranged in a position which does not correspond to the assembled condition. Rather, the screw cap is practically placed upside down, arranged over the pour-out spout 2.

The screw cap 4 has a skirt wall 40 which is covered on one side by the cover surface 41. The skirt wall 40 has an inner thread 42 which is designed fitting with the outer thread 23 of the pour-out spout 2. A guarantee strip 44 is integrally formed flush with the skirt wall 40 on its lower end, via breakage locations 43. Two catches 46 are arranged on the inner surface of the cover surface 41, which in the assembled condition of the closable opening device 100 cooperate with the catches 36 in the cutting element 3. A short annular wall 45 is integrally formed concentrically to the skirt wall 40 of the screw cap 4, between the skirt wall 40 and the catches 46. The annular wall 45 has an outwardly directed annular bead, which in the closed condition of the closable opening device sealingly bears on the inner side of the skirt wall 20 of the pour-out spout 2.

The individual parts 2, 3 and 4 of the semi-finished product 1 are connected to one another via breakage bridges. The connection between the pour-out spout 2 and the cutting element 3 is formed by first breakage bridges 5, while the connection between the cutting element 3 and the screw cap 4 is formed by second breakage bridges 6. The first breakage bridges 5 are integrally formed on the upper plane edge of the cylindrical skirt wall 20 of the pour-out spout 2, and are integrally formed on the other side in the lower edge region of the lower edge 33 of the cutting element 3, directed peripherally to the outside. The cutting element 3 in the region of the lower edge 33 above the teeth 35 has an outwardly projecting, peripheral shoulder 38. Preferably, the first breakage bridges 5 are present in the region of the shoulder 38 and have an essentially roughly triangular shape whose pointed ends are directed radially outwards, and in the region of the upper edge 25 of the pour-out spout are thus connected. In this manner, one may form relatively stable breakage bridges, which although can be separated by machine without any problem, and should not be inadvertently destroyed with the mold removal procedure and the subsequent transfer into an assembly device. The first breakage bridges 5 have an upper or a lower edge which is exactly aligned radially towards the skirt wall of the pour-out spout 5, and is at least approximately flush with the upper edge 25 of the skirt wall 20 of the pour-out spout. The first breakage bridges 5 may be designed as a single, peripheral destructible, annular membrane. The material passage may be increased by such design, in order to achieve a correspondingly higher filling speed of the injection mold.

The connection between the cutting element 3 and the screw cap 4 is formed by second breakage bridges 6. These breakage bridges 6 may be designed practically flush with the inner skirt wall surface 34 and can lead from there directly to the surface of the cover surface 41 of the screw cap 4. The cover surface 41 may comprise a recess on the surface, whose diameter corresponds roughly to the inner diameter of the cutting element 3. With this, an edge arises at the transition region of the recess to the raised edge region, and the second breakage bridges 6 may be aligned directly onto this edge.

Figure 2:
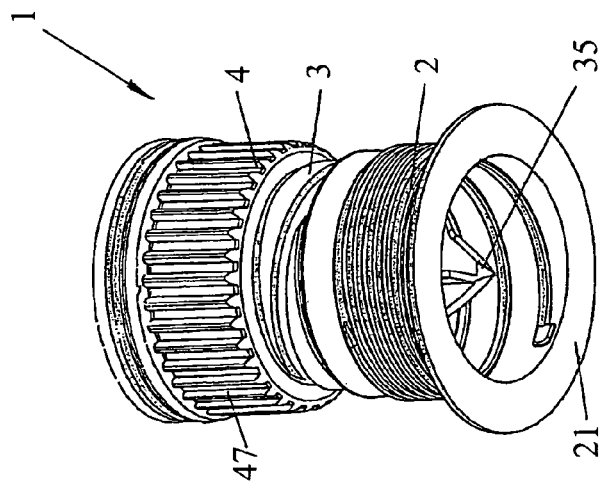
FIG. 2 shows a perspective view of the semi-finished product according to FIG. 1, in a view obliquely from above, with a view into the screw cap.
Figure 3:
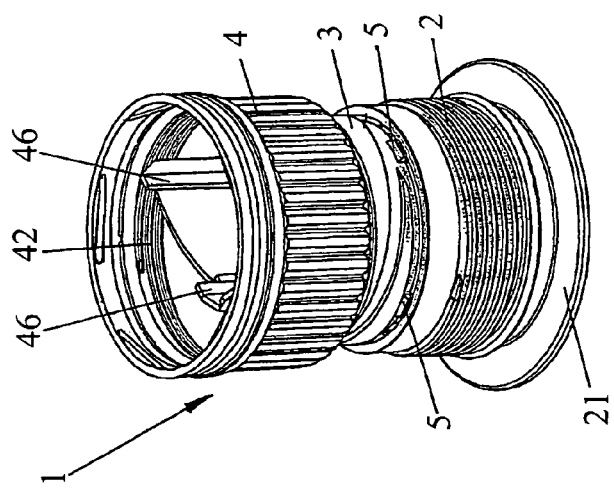
FIG. 3 shows an isometric representation as shown in FIG. 2, with a view obliquely from below and with a view into the pour-out spout.

As shown in FIGS. 2 and 3, a semi-finished product 1 according to this invention may be manufactured with a relatively simple mold with a slide. The separation of the injection mold is designed such that the parting plane is between the cover surface of the screw cap 4 and the cutting element 3. In this manner, the catch parts 36 and the teeth 35 may be manufactured in the one injection mold half, and the catches 46 as well as the annular wall 45 may be manufactured in the other injection mold half. All elements which are integrally formed on the outer periphery of the semi-finished product may be simply manufactured and removed from the mold by slides. Such shaping means on the periphery may for example also be a ribbing 47 on the skirt wall outer side of the screw cap 4. The ribbing 47 increases the grip of the screw cap. First breakage bridges 5 are shown in FIG. 2, the second breakage bridges 6 are invisible in the view according to FIG. 2 as well as in the view according to FIG. 3.

Figure 4:
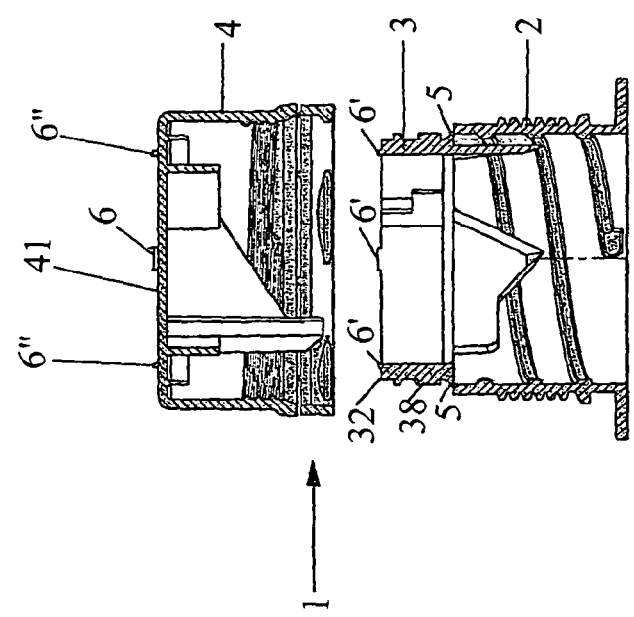
FIG. 4 shows an axial vertical section taken through the semi-finished product according to FIG. 1, with which the screw cap is separated and shown in a turned manner, in an intermediate position of assembly.
Figure 5:
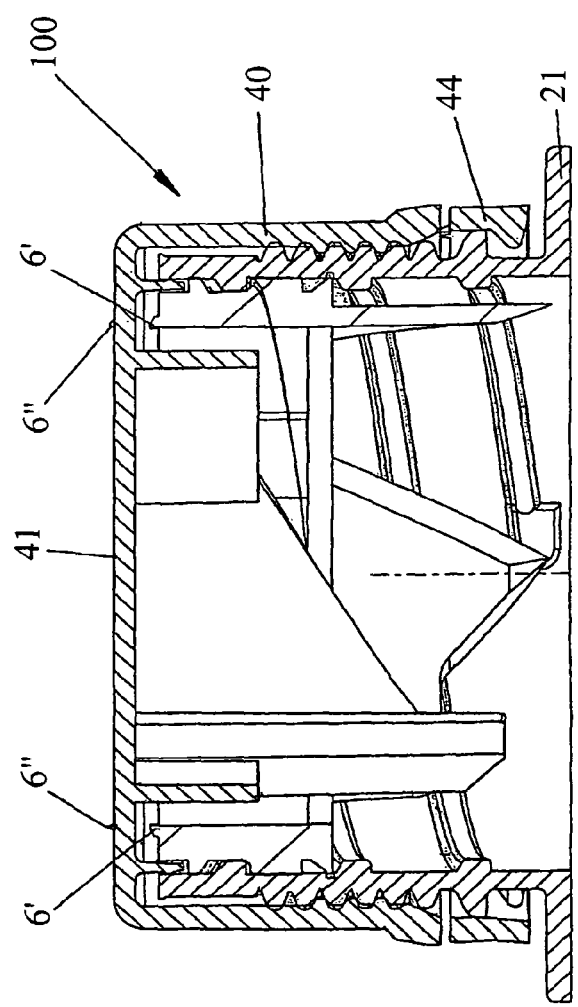
FIG. 5 shows the closure device according to this invention in the completely assembled condition, in an axial vertical section.

In FIG. 4, the semi-finished product may no longer be in the manufacturing condition, but the screw cap 4 is already separated from the cutting element 3. The cutting element 3 is connected to the pour-out spout 2. Accordingly, the first breakage bridges 5 are not yet destroyed, while the second breakage bridges 6 are destroyed and only the remains of their attachment 6' and 6" are visible. The remains which are on the upper edge 32 of the cutting element 3 are indicated at 6', while the breakage bridge remains on the surface of the cover surface 41 and are indicated at 6". These remains are typical recognition features, which allow one to see that the screw cap 4 was part of a semi-finished product 1 according to this invention. The patent claim which is directed to the closable opening device adopts this feature as a characterizing feature. Without this feature, one may hardly recognize from the opening device 100 as shown in FIG. 5, as to whether the opening device has arisen from a semi-finished product 1 according to this invention, or from two parts, specifically a semi-finished product which has only been manufactured from the pour-out spout and cutting element and a separate screw cap, or an opening device which was constructed of three individual parts. The cooperation of the individual elements is evident in FIG. 5, without these parts being dealt with once again.

An assembly method of this invention is described with reference to FIG. 6, which produces an assembled closable opening device 100 arises from the semi-finished product 1. In the first step which is shown to the left in FIG. 1, the semi-finished product 1 is shown in the condition in which it arrives ready from the injection mold. In a first step, one grips the screw cap 4 while simultaneously the pour-out spout with the integrally formed cutting element 3 is held. A relative movement of the screw cap 4 is now performed. This relative movement is a rotational movement in the drawing, but this of course may also be a translatory movement. By way of this relative movement, the second breakage bridges 6 between the screw cap 4 and the cutting element 3 are separated. Because the second breakage bridges are designed significantly thinner than the first breakage bridges 5, the first breakage bridges 5 remain undestroyed. The breakage bridges 5 may be all formed equal in cross section, but different in number, but this is not necessary. The method may be carried out even if the second breakage bridges 6 are designed more strongly than the first breakage bridges 5, but then one would usefully or necessarily grip the screw cap 4 and hold the cutting element 3 instead of the pour-out spout 2. It would probably be simpler for a correspondingly designed assembly device to firmly hold the pour-out spout 2, for example by clamping the flange 21.

After the separation of the screw cap 4 from the remains of the semi-finished product 1, the cap is now rotated or turned by 180°, so that the inner side of the screw cap is directed towards the through-opening of the pour-out spout 2. Because the semi-finished product remains are held and the screw cap 4 is already injected or grasped in the position as a semi-finished product, the relative radial alignment of the parts is completely predetermined and a further alignment is thus no longer necessary. A radial shifting of the cutting element 3 relative to the pour-out spout 2 is not possible because these parts are still coherent as one piece. A radial displacement of the screw cap 4 relative to the cutting element 3 or to the pour-out spout 2 may be avoided by a suitable ribbing 47 or by the correct mechanical gripping of the screw cap 4 by the assembly device.

In the third method step, the screw cap 4 is located axially centrically directed onto the remainder of the semi-finished product 1 and is already rotated or turned so that the opening of the screw cap 4 is directed towards the opening of the pour-out spout 2. In this situation, the assembly may be effected by a simple axial movement of the screw cap 4 onto the remainder of the semi-finished product 1, because the parts are inserted correctly into one another and the inner thread 42 of the screw cap 4 slides over the outer thread 23 of the pour-out spout 2 in a ratchet-like manner and thereby the cutting element 3 with its upper edge 32 comes to bear on the inner surface of the cover surface 41 of the screw cap 4, so that the first breakage bridges 5 are destroyed under the prevailing pressure, and the cutting element 3 with its outer thread 31 likewise slides over the inner thread 22 of the pour-out spout 2 in a ratchet like manner, until all three parts come into their defined end position, so that the closable opening device is now in the assembled condition, in which the opening device may be bonded or welded on a sealed receptacle. On opening for the first time, the screw cap 4 is rotated to the top, and thereby the cutting element 3 is displaced downwards in a helical movement, wherein the teeth 35 cut open the receptacle, which is of a single-layer or multi-layer laminate or film material, wherein the guarantee strip 44 is simultaneously separated away.

With the semi-finished product according to this invention, less aligning movements are required on assembly, and thus the assembly device as such becomes simpler, may function more rapidly and less disturbances occur, by which the efficiency is increased further. One may manufacture more opening devices with less injection molding machines because only a single injection mold is required. All these advantages lead to considerable cost savings which are even more important because with the opening devices of this invention, the elements can be manufactured in a quantity of billions.

The invention claimed is:

1. A semi-finished product for the manufacture of a closable opening device (100) for a sealed packaging which contains a flowable medium, wherein the device comprises a pour-out spout (2) with a flange (21), a cylindrical cutting element (3) with an upper edge (32) defining a plane surface and a lower edge (33) with one or more teeth (35), and an inner skirt surface with catches (36) which act in a radial direction and which cooperate with catches (46) on an inner side of a cover surface in a screw cap (4), the cylindrical cutting element (3) of the semi-finished product (1) with the lower edge (33) on which the teeth (35) are integrally formed, projects in the pour-out spout (2), the upper edge (32) of the cylindrical cutting element (3) projecting beyond an upper edge (25) of the pour-out spout (2), and the screw cap (4) with a cover surface directed to the upper edge (32) of the cutting element, and the pour-out spout (2) with the cutting element (3) and the cutting element (3) with the screw cap (4) manufactured in a separable manner as one piece via first and second breakage bridges (5, 6).

2. A semi-finished product according to claim 1, wherein the cutting element (3) comprises an outer thread (31) which corresponds with an inner thread (22) in the pour-out spout (2).

3. A semi-finished product according to claim 1, wherein the cutting element (3) comprises a guide which corresponds to a groove guide in the pour-out spout.

4. A semi-finished product according to claim 1, wherein an outwardly projecting peripheral shoulder (38) is on the lower edge (33) of the cutting element (3) above the teeth.

5. A semi-finished product according to claim 4, wherein the first breakage bridges (5) are near the shoulder (38) which are directed radially outwards with a pointed end and are connected near the upper edge (25) of the pour-out spout (2).

6. A semi-finished product according to claim 5, wherein the first breakage bridges (5) have a lower edge or an upper edge directed radially to a skirt wall of the pour-out spout (2) and is flush at least approximately with the upper edge (25) of the pour-out spout (2).

7. A semi-finished product according to claim 1, wherein the first breakage bridges (5) each is designed as a peripheral, destructible annular membrane.

8. A semi-finished product according to claim 1, wherein the cover surface (41) of the screw cap (4) comprises a centric recess with a diameter that corresponds to an inner diameter of the cylindrical cutting element (3) and the second breakage bridges (6) arranged flush with an edge of the centric recess.

9. A method of manufacturing a closable opening device from the semi-finished product of claim 7 comprising in a first step. the screw cap (4) is gripped and by way of a relative movement of the screw cap to a remains (2, 3) of the semi-finished product is separated from the remains of the semi-finished product, in a second step the screw cap (4) is turned and aligned so that the screw cap with an opening is aligned onto the pour-out spout (2) and is brought into a correct position capable of being screwed on and in a third step by axial movement the second breakage bridges (6) between the pour-out spout (2) and the cutting element (3) are separated, the screw cap (4) is pushed onto the pour-out spout (2), and the cutting element (3) is pushed into the pour-out spout so that the opening device (100) gets into an assembled condition.

10. A method according to claim 9, wherein the relative movement carried out in the first step is a rotation movement.

11. A method according to claim 9, wherein the relative movement carried out in the first step is a translatory movement.

12. A semi-finished product according to claim 1, wherein a breakage bridge remains (6") on a surface of the cover of the screw cap (4), and a breakage bridge remains (6') on a plane edge (32) of the cutting element (3).

13. A method of manufacturing a closable opening device from the semi-finished product of claim 1 comprising in a first step the screw cap (4) is gripped and by way of a relative movement of the screw cap to a remains (2, 3) of the semi-finished product is separated from the remains of the semi-finished product, in a second step the screw cap (4) is turned and aligned so that the screw cap with an opening is aligned onto the pour-out spout (2) and is brought into a correct position capable of being screwed on and in a third step by axial movement the second breakage bridges (6) between the pour-out spout (2) and the cutting element (3) are separated, the screw cap (4) is pushed onto the pour-out spout (2), and the cutting element (3) is pushed into the pour-out spout so that the opening device (100) gets into an assembled condition.

14. A method according to claim 13, wherein the relative movement carried out in the first step is a rotation movement.

15. A method according to claim 13, wherein the relative movement carried out in the first step is a translatory movement.

* * * * *